Jan. 5, 1965  D. G. ANDERSON ETAL  3,164,142
SPRING ACTUATED STARTER FOR ENGINES
Filed July 5, 1962  2 Sheets-Sheet 2
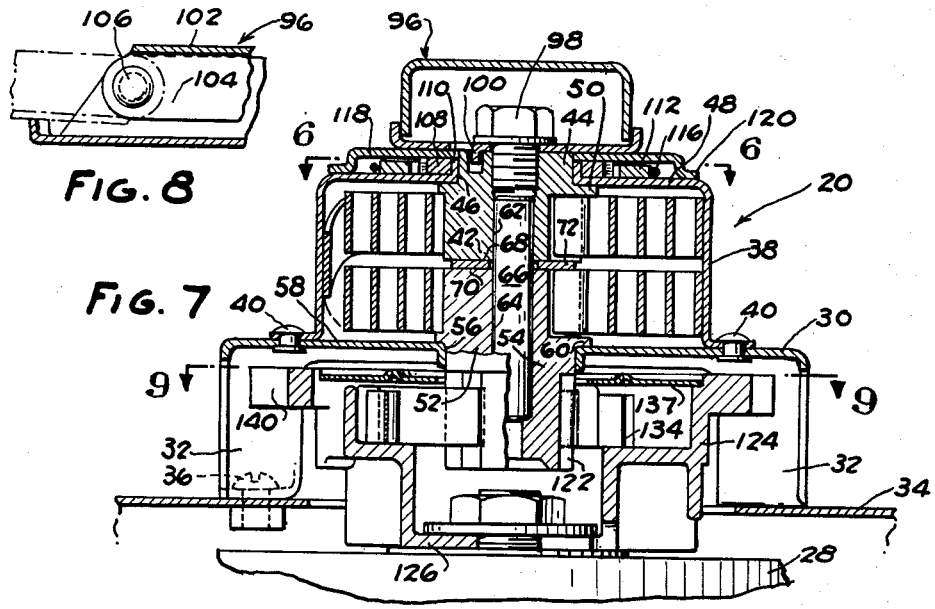
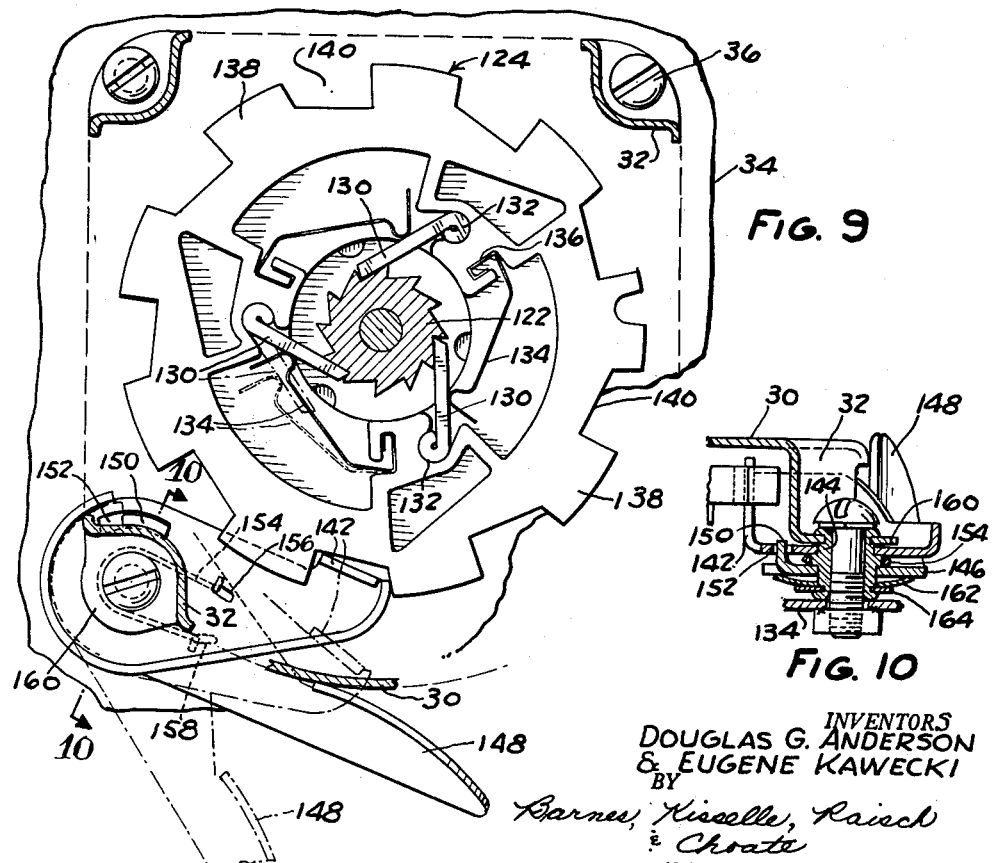
INVENTORS
DOUGLAS G. ANDERSON
& EUGENE KAWECKI
BY
Barnes, Kisselle, Raisch
& Choate
ATTORNEYS

United States Patent Office 3,164,142
Patented Jan. 5, 1965

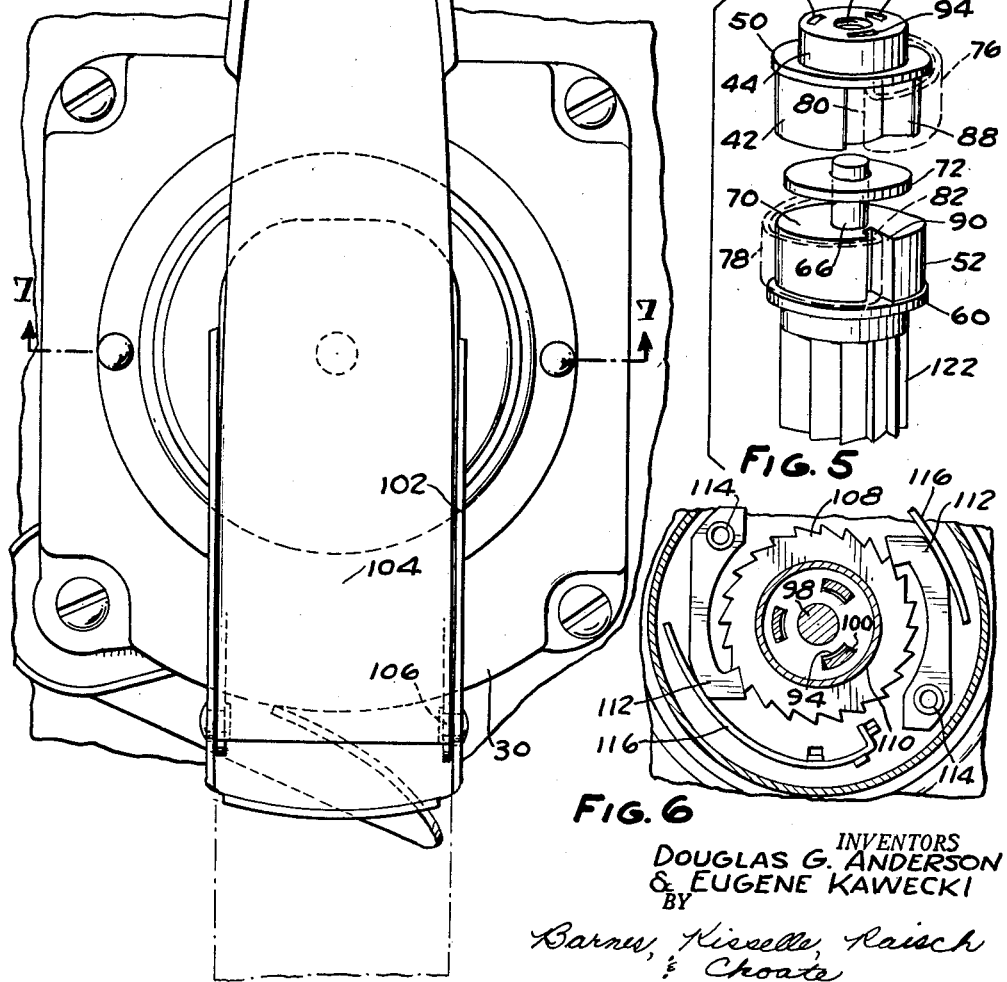

3,164,142
SPRING ACTUATED STARTER FOR ENGINES
Douglas G. Anderson and Eugene Kawecki, Detroit, Mich., assignors, by mesne assignments, to Sturdevant Manufacturing Corporation, Detroit, Mich., a corporation of Michigan
Filed July 5, 1962, Ser. No. 207,684
9 Claims. (Cl. 123—179)

This invention relates to a starter of the type used in connection with relatively small gasoline engines which power equipment such as lawnmowers, garden equipment, and the like.

Conventionally, starters of this type use a flat spiral spring having one end secured to a wind-up shaft and the other end secured to a neighboring element which is stationary while the spring is being wound. The convolutions of the spring conventionally pass between the outer anchoring point and a radially inward adjacent post which retains the convolutions in a direction which is generally circumferential of the center of the spring.

When the spring is tightly wound, the adjacent convolutions are interengaged. When the spring unwinds slightly, the portions of the convolutions remote from the post spread out and disengage, but the portions between the post and outer anchor remain engaged. During unwinding of the spring, the latter portions of the adjacent convolutions rub against each other resulting in a frictional loss of usable energy.

The object of this invention is to provide a starter structure which is simple, less expensive, and lighter weight than prior starters and which has improved spring efficiency.

Generally, the invention contemplates the use of a spring having two generally flat spiral portions disposed side by side and being interconnected by an axial bridging portion. The starter has separate independently rotatable shafts, one for winding the spring and the other for being driven by the spring for rotating an engine crankshaft of the like. One end of the spring is connected to the wind-up shaft and the other end of the spring is connected to the drive shaft. On form of the invention is shown in the accompanying drawings.

FIG. 1 is a diagrammatic view illustrating a starter according to this invention mounted on an engine.

FIG. 2 is an enlarged top plan view of the starter.

FIG. 3 is a side elevational view of the spring used in the starter.

FIG. 4 is a fragmentary plan view of the spring shown in FIG. 3.

FIG. 5 is an exploded perspective view of the shafting used in the starter with portions of the spring being shown in phantom.

FIG. 6 is a sectional view on line 6—6 of FIG. 7.

FIG. 7 is a sectional view on line 7—7 of FIG. 2.

FIG. 8 is a fragmentary view of a portion of the operating handle illustrating the pivoted sections.

FIG. 9 is a generally sectional view on line 9—9 of FIG. 7.

FIG. 10 is generally a sectional view on line 10—10 of FIG. 9.

Shown in the drawings is a starter 20 according to this invention mounted on an engine 22 having a vertical crankshaft 24 connected to a piston 26 and having a fly wheel 28 at its upper end operably connected with the starter. Starter 20 has a base 30 with legs 32 adapted to be bolted onto the crankcase 34 of engine 22, as at 36. A housing 38 is secured on base 30 by bolting 40. Within the housing is a wind-up shaft 42 having an end portion 44 journaled in an opening 46 in an end wall 48 of housing 38. Shaft 42 has a retaining flange 50 engaged with the interior of wall 48.

Axially adjacent shaft 42 is a driven or output shaft 52 having an outer end portion 54 journaled within an opening 56 in the top 58 of base 30 which may also be considered as an end wall of housing 38. Shaft 52 has a retaining flange 60 engaged against end wall 58.

The inner ends of shafts 42, 52 are provided with axially aligned openings 62, 64 engaged with and supporting a common bearing pin 66. With this arrangement, shafts 42, 52 are independently rotatable. Shaft 42 has an end bearing face 68 and shaft 52 has an opposing end bearing face 70, these bearing faces being engaged against an interposed spacer and bearing washer 72.

An actuating spring 74 is disposed within housing 38. This spring has two generally flat spiral portions 76 and 78 disposed in relatively close side-by-side relation in generally parallel planes. Spiral portions 76 and 78 have inwardly hooked ends 80 and 82 at their innermost convolutions. The spiral portions are interconnected by a bridging portion 84 which extends axially between the spirals; and in the spring illustrated, the bridge extends in an axial helical direction. Shafts 42, 52 pass through the central opening 86 in the spring. Inner end 80 of sprial 76 hooks into a radial opening 88 in shaft 42 and end 82 hooks into a radial slot 90 in shaft 52. Recess 88 extends angularly through about 90° in a circumferential direction for a purpose to be described.

End portion 44 of wind-up shaft 42 projects exteriorly of housing wall 48 and has in its end face a central threaded opening 92 and three surrounding recesses 94. A wind-up handle 96 is secured to shaft 42 by a bolt 98 threaded into opening 92 and a positive rotary drive is provided by struck-out lugs 100 engaged within recesses 94. Handle 96 has two relatively foldable portions 102 and 104 pivoted together as at 106.

A ratchet ring 108 is fixed on the underside of handle 96 surrounding a flange 110 projecting from opening 46 in housing wall 48. A pair of pawls 112 are pivoted onto housing wall 48 as at 114 and are biased inwardly into engagement with ratchet 108 by leaf springs 116 also secured on wall 48. A cover plate 118 fixed on handle 96 extends radially beyond the pawls and springs and has an outward offset portion 120 extending axially toward wall 48 to provide a protective closure for the pawl and ratchet structure.

The lower end portion 122 of shaft 52 projects exteriorly of wall 58 and terminates in a ratchet cylinder. Surrounding ratchet 122 is a cup 124 whose bottom 126 is adapted to be secured to engine fly-wheel 28 as illustrated in FIG. 7. Within cup 124 are a number of pawls 130 having end portions pivotally contained within recesses in the cup as at 132 and having their free ends biased inwardly for engagement with ratchet 122 by leaf springs 134 provided with ends non-rotatably contained by openings in cup 124 as at 136. Pawls 130 and springs 132 are vertically slidably insertable into and removable from their respective recesses. A cover plate 137 is provided over the top of cup 124 for retaining pawls 130 and springs 134.

The upper rim of cup 124 is provided with an alternate circumferential series of dogs 138 and notches 140. A dog 142 releasably engages within one of the notches 140 to releasably anchor cup 124 against rotation. Dog 142 is assembled on a pivot 144 adjacent a portion 146 of a release handle 148. Dog 142 pivots relatively freely relative to handle 148, but the relative pivoting motion is limited by engagement of an upstanding lug 150 on handle portion 148 within an arcuate slot 152 in the dog member. A spring 154 having end portions 156 and 158 secured respectively to dog 142 and handle 148 urges the dog inwardly toward engagement within notches 140. When handle 148 is turned, dog 142 is carried with it to and from engagement with recesses 140.

Handle 148 has a frictional pivot mounting with a foot 160 at the lower end of one mounting leg 32; and for this purpose, an axially compressed spring 162 is interposed between handle portion 148 and a retaining washer 164. Pivot 144 also provides a rivet securing the assembly together as shown in FIG. 10. Rivet 144 is hollow so that foot 160 together with the release lever and dog assembly can be bolted onto crankcase 34 as shown.

In use, it may be assumed that the starter 20 is assembled on engine 22 with cup 124 connected with fly-wheel 28 as shown. The engine is at rest and spring 74 is unwound. Release handle 148 is swung counterclockwise to the solid line position of FIG. 9 and dog 142 is either engaged within a notch 140 or is engaged radially against the outer surface of a lug 138. The latter condition is permitted by the spring biased pivotal connection between dog 142 and handle 148.

Handle 96 is turned clockwise as the drawings are viewed, and wind-up shaft 42, because of the interengagement of spring end 80 and recess 88, winds up the spring. During the winding, shaft 52 is held against rotation with shaft 42 under the action of spring 74 by engagement of ratchet 122 with pawls 130 anchored on cup 124 which is in turn secured against rotation by dog 142. If, in the beginning, dog 142 was engaged against a lug 138 rather than in a recess 140, upon slight turning of shaft 52 under the action of spring 74, a recess 140 will turn into alignment with dog 142 which will be snapped into the recess under the action of spring 154. Thereafter, the winding will continue in the manner described.

The teeth of ratchet ring 108 are oriented to pass freely by pawls 112 during the winding. When handle 96 is released, pawls 112 secure shaft 42 and handle 96 against retrograde movement under the action of spring 74. Thus, the ratchet and pawls associated with shaft 42 together with ratchet cylinder 122, pawls 130, cup 124, and dog 142 provide a system for storing energy in spring 74.

To release the starter, handle 148 is swung clockwise as FIG. 9 is viewed to withdraw dog 142 from a notch 140. This releases cup 124 for rotation, and the cup is driven in a clockwise direction by the action of spring 74 acting through shaft 52, ratchet cylinder 122, and pawls 130. The cup, in turn, rotates the crankshaft or fly-wheel 28.

When the engine starts, fly-wheel 28 and cup 124 overtake ratchet 122, and at the moment that this occurs, pawls 130 are released from frictional engagement with the ratchet and are free to swing outwardly, which they do by centrifugal force as the engine gathers speed. The centrifugal force is great enough to overcome the biasing force of springs 134, and the pawls swing outwardly to the dotted-line position of FIG. 9. When the engine stops, pawls 130 return to engagement with ratchet cylinder 122 under the action of springs 134 and dog 142 may then be returned to engagement within a notch 140 to condition the starter for rewinding and another starting operation.

When spring 74 is tightly wound, the convolutions of both spirals 76, 78 are engaged against their neighbors. The spring is wound to solid condition. Upon slight rotation of shaft 52 in a driving direction, the convolutions of the spring disengage from each other so that thereafter as portions of the spring move angularly relative to each other, there is no frictional interengagement of the convolutions and no frictional loss of usable energy in the spring.

As the spring unwinds, the system comprising the spring and shaft 52 develop a certain amount of angular momentum so that if spring end 80 were rigidly connected to shaft 42, shaft 42 and handle 96 would be subject to a slight rotary impact at the end of the spring rundown. This manifests itself in a sudden turning of the winding handle through somewhat less than a quarter of a turn. This characteristic is not dangerous, but it is startling to a person not prepared for it.

To eliminate this characteristic, a lost motion coupling is provided between the spring and winding shaft. For this purpose, recess 88 instead of being just wide enough to receive spring end 80 extends circumferentially through about 90°. At the end of the spring rundown, spring end 80 is merely carried angularly part way across recess 88 and stops before it strikes the opposite wall of the recess. Thus, shaft 42 and handle 96 are not subjected to any turning moment and remain stationary. When handle 96 is again turned for winding the spring, shaft 42 first turns independently until one wall of the recess engages spring end 80 and thereafter the spring is wound in the manner described.

The invention thus provides a starter in which the spring action is more efficient than the spring action in conventional starters. In addition, the winding and driving mechanism is very simple, inexpensive, and light weight. Starters according to this invention in actual manufacture are lighter weight, less expensive, and deliver greater starting energy than comparable conventional starters.

We claim:

1. In a coil spring type starter having a housing which mounts a spring winding shaft, a spring driven shaft connectible wih said engine or the like to be started and means for releasably storing energy in the spring tending to rotate the spring driven shaft, improved structure wherein each of said shafts has an outer end journaled on said housing, the inner ends of said shafts engaging a common bearing member supported by said shafts, said spring having ends, one of which is operably connected with said wind-up shaft and the other of which is operable connected with said driven shaft.

2. The combination defined in claim 1 wherein the inner ends of said shafts have openings which are substantially in axial extension of each other, said bearing member comprising a pin engaged within and extending between said openings.

3. The combination defined in claim 2 wherein said spring ends are secured to radially outer surface portions of said shafts.

4. The combination defined in claim 1 wherein the inner edns of said shafts are in mutual axially supporting relation to each other.

5. The combination defined in claim 4 wherein said inner ends have end faces providing opposed bearing surfaces.

6. The combination defined in claim 5 wherein a bearing plate is disposed between said bearing surfaces.

7. The combination defined in claim 1 wherein said housing has aligned openings within which said outer ends of said shafts are journaled in substantially coaxial relation, said shafts having flanges which engage the housing interior adjacent said openings to retain said shafts within said housing, said inner ends of said shafts having end faces forming bearing surfaces which are opposed to each other facilitating relative rotation of said shafts and forming mutual inner axial support for said shafts, the inner ends of said shafts having substantially axially aliged bearing openings, said bearing member comprising a pin engaged within said openings.

8. In a coil spring type starter having a housing which mounts a spring winding shaft, a spring driven shaft connectible with an engine or the like to be started, and means for releasably storing energy in the spring tending to rotate the spring driven shaft, improved structure wherein each of said shafts has an outer end journaled on said housing, the inner ends of said shafts engaging a common bearing member supported by said shafts, said spring having two axially displaced generally flat spiral portions interconnected by an axial bridging portion, the ends of said spring being operably connected, one with said winding shaft and the other with said driven shaft.

9. In a coil spring type starter having a housing which rotatably supports a spring winding shaft, a spring driven shaft connectible with an engine or the like to be started, and means for releasably storing energy in the spring tending to rotate the spring driven shaft, the improvement wherein each of said shafts is rotatable relative to said housing and to the other said shaft, the inner ends of said shafts having opposed end faces forming axial bearing surfaces, the inner ends of said shafts having axially aligned openings therein, a pin within said opening for rotatably supporting said driven shaft within said housing, said spring having two axially displaced generally flat spiral portions interconnected by an axial bridging portion, the ends of said spring being operably connected, one with said winding shaft and the other with said driven shaft.

References Cited in the file of this patent

UNITED STATES PATENTS

| | | |
|---|---|---|
| 448,208 | Camichel | Mar. 17, 1891 |
| 1,595,286 | Boucher | Aug. 10, 1926 |
| 1,917,486 | Beck | July 11, 1933 |
| 3,055,351 | Siwek | Sept. 25, 1962 |
| 3,081,760 | Hamann | Mar. 19, 1963 |
| 3,091,947 | Thomsen | June 4, 1963 |

FOREIGN PATENTS

| | | |
|---|---|---|
| 388,608 | Great Britain | Mar. 2, 1933 |